No. 646,378. Patented Mar. 27, 1900.
H. SZAMATOLSKI.
FLUID INTERCHANGING DEVICE.
(Application filed Feb. 12, 1900.)
(No Model.)
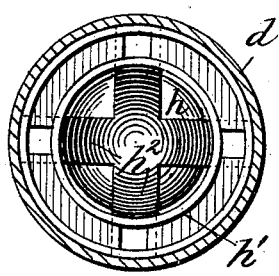
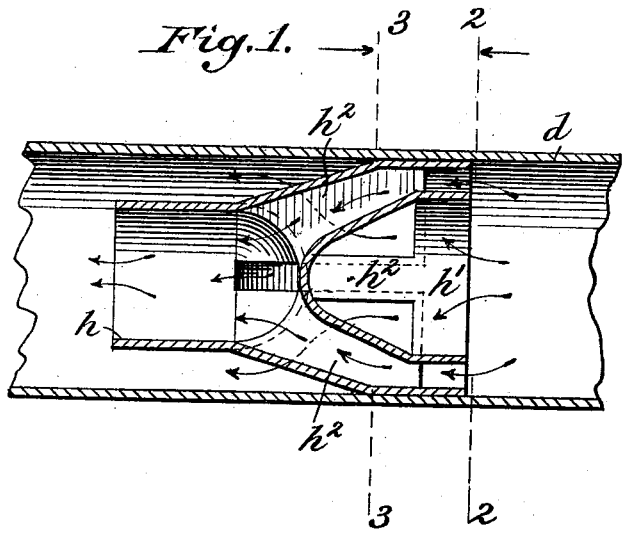
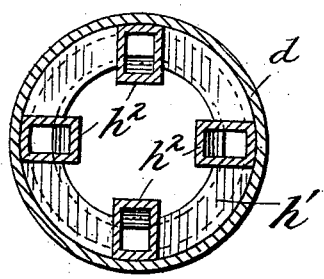
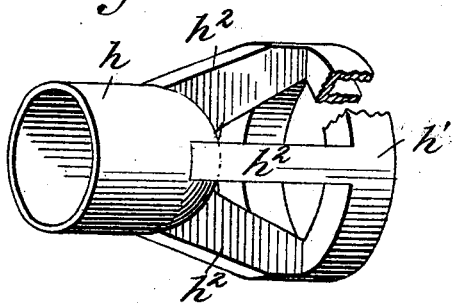
Witnesses:
F. H. Schott
Anton Aloetzner
Inventor:
Hugo Szamatolski,
by his Attorney

UNITED STATES PATENT OFFICE.

HUGO SZAMATOLSKI, OF FRANKFORT-ON-THE-MAIN, GERMANY.

FLUID-INTERCHANGING DEVICE.

SPECIFICATION forming part of Letters Patent No. 646,378, dated March 27, 1900.

Original application filed December 30, 1899, Serial No. 742,149. Divided and this application filed February 12, 1900. Serial No. 4,951. (No model.)

*To all whom it may concern:*

Be it known that I, HUGO SZAMATOLSKI, a subject of the King of Prussia, German Emperor, residing at No. 13 Gutleutstrasse, Frankfort-on-the-Main, Germany, have invented certain new and useful Improvements in Fluid-Interchanging Devices, of which the following is a specification, (which is a division of my application, Serial No. 742,149, filed December 30, 1899, now Patent No. 643,990, dated February 20, 1900.)

This invention relates to fluid-interchanging devices which shall be introduced into conduits—for instance, into the pipes of a tubular superheater or the like. By means of such interchanging devices, of which there may be several in one and the same pipe—for instance, in a steam-pipe—every portion of the fluid passing through the said pipe will be forced to come in contact with the sides of the pipes, so as to prevent the fluid from passing through the pipe in such a manner that a central portion of the fluid passes through without coming in contact with the superheating-surfaces. It is for the purpose of causing the central column of steam or other fluid or liquid to be directed against the walls of the pipe into which the interchanging devices are inserted, these being so arranged that they direct the fluid from the central portion of the conduit at one side of the interchanging device to the inner peripheral portion of the conduit at the opposite side of the interchanging device and direct the fluid from the peripheral portion of the conduit on one side of the interchanging device to the central portion of the conduit on the other side of the interchanging device, so that a continual change of the two columns or layers of fluid takes place, and consequently every portion of the fluid is brought under the influence of the heated walls of the tube.

An interchanging device embodying my invention will now be described in connection with the accompanying drawings and then particularly pointed out in the claims.

In the drawings, Figure 1 is a longitudinal section through the center of a device embodying my invention, showing it located in the steam-pipe of a superheater, which pipe is also shown in section; Fig. 2, a section on the line 2 2, Fig. 1, looking in the direction of the respective arrow; Fig. 3, a section on the line 3 3, Fig. 1, looking in the direction of the respective arrow; and Fig. 4, a perspective view of the interchanging device removed from the pipe, a part being broken away.

Each interchanging device consists of an annular tubular piece $h'$, connected to a single tube $h$ of smaller diameter, the connection between $h$ and $h'$ being effected by separate channels $h^2$. The annular piece $h'$ fits closely against the steam-pipe $d$, while the tube $h$ being of smaller diameter is some distance from the steam-pipe. If the steam, for example, passes through the pipe in the direction of the arrow, the portion thereof which flows along the walls of the pipe will be caught up by the annular piece $h'$ and be led through the channels $h^2$ into the tube $h$, whence the steam will pass along the central part of the pipe. On the other hand, the portion of the steam which has been flowing along the central part of the pipe will be deflected toward the walls of the pipe, as this steam will pass through the central space of the annular tube and will pass through the spaces between the channels $h^2$ to the outer side of the tube $h$. At the second and every following interchanging device the above-described action will be repeated. This action will also take place if the steam be led through the pipe in the contrary direction.

The number of interchanging devices employed depends upon the length of the pipe, as also upon the velocity of the steam. In every case the introduction of such interchanging devices enables one to obtain a very uniform superheating of the steam—that is to say, a very effective utilization of the heat of the combustion-gases. In other words, the exchange of heat between the steam passing through the interior of the pipes and the gases passing along the outer surface thereof is effected in a much more perfect manner by the use of these fluid-interchanging devices than without them. This will also be the case when the pipe $d$ is not actually used for superheating steam passing through it or when the pipe is heated by combustion-gases externally, as this arrangement can be used not only for steam-superheaters, but also generally for any apparatus for the interchange of heat—such, for instance, as for feed-water heaters and the like.

An essential advantage of the above-described construction as compared with known apparatus is to be found in that the said interchanging devices only produce throttling of the steam to a minimum extent. The sectional area of the steam-pipe or the like is only narrowed to an extent corresponding to the thickness of the walls of the annular tubular piece $h'$ and the passages $h^2$.

Having now described my invention, what I desire to secure by a patent of the United States is—

1. The combination with a conduit, of a fluid-interchanging device located in said conduit and having two sets of passages, one set leading from an inner portion of the conduit on one side of the interchanging device to an outer portion of the conduit on the other side, the other set of passages leading from an outer portion of the conduit on the first-mentioned side of the interchanging device to an inner portion of the conduit on the other side of the interchanging device, whereby the inner and outer layers of fluid are interchanged.

2. A fluid-interchanging device comprising an annular piece open in one direction, a tubular piece smaller than the annular piece and open in the opposite direction, and channels connecting the annular piece with the tubular piece and having openings between them.

In witness whereof I have hereunto set my hand in presence of two witnesses.

HUGO SZAMATOLSKI.

Witnesses:
  JEAN GRUND,
  CARL GRUND.